March 19, 1929.  M. W. RUMLEY  1,705,540
CHILD'S VEHICLE
Filed Aug. 10, 1927  2 Sheets-Sheet 1
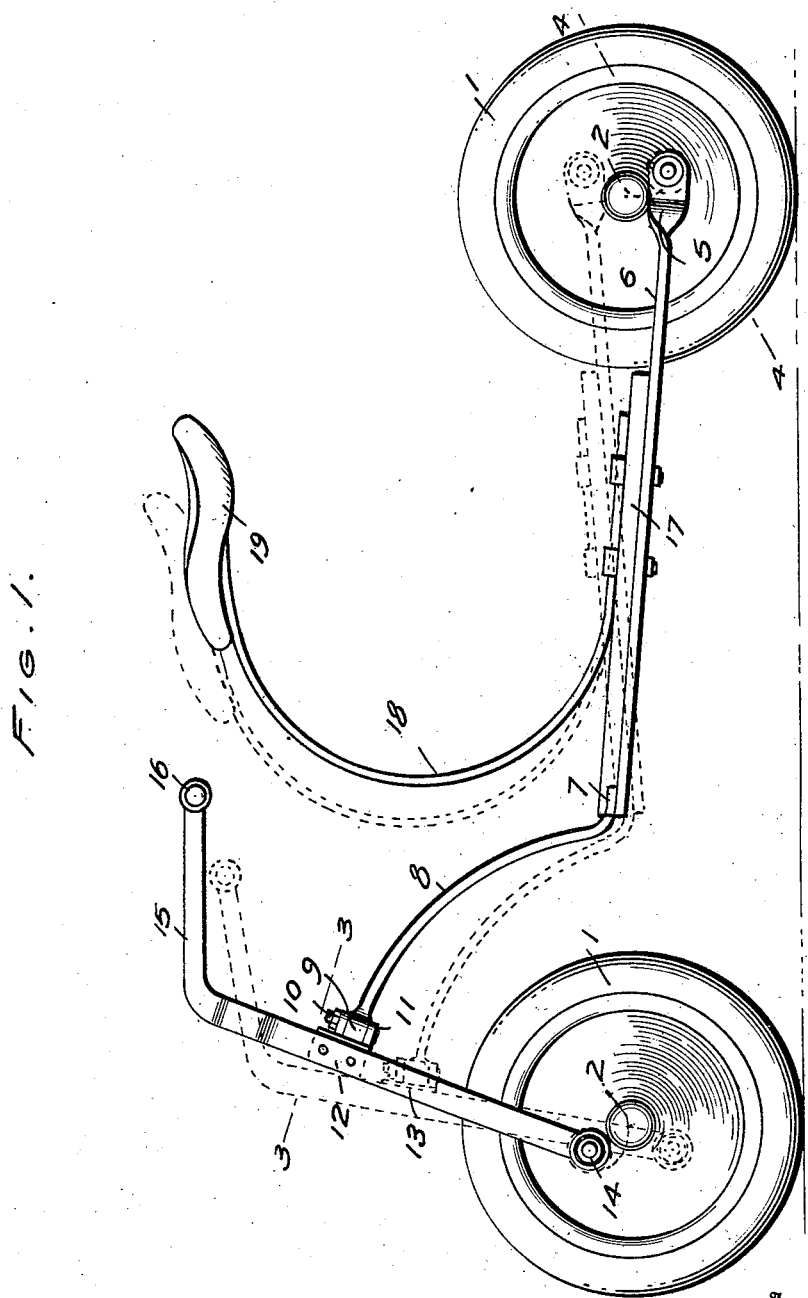
Inventor
MILES W. RUMLEY
By C. A. Snow & Co
Attorneys March 19, 1929.   M. W. RUMLEY   1,705,540
CHILD'S VEHICLE
Filed Aug. 10, 1927   2 Sheets-Sheet 2
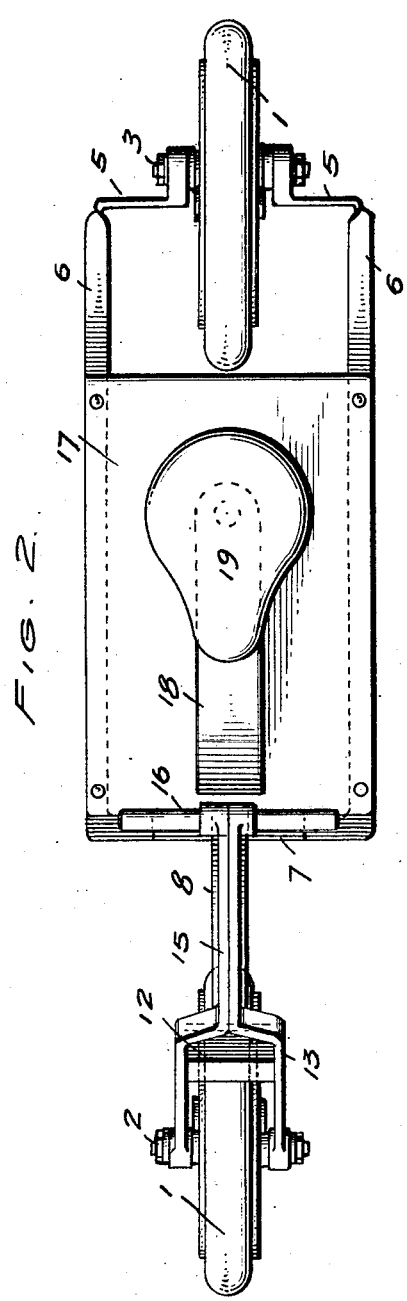
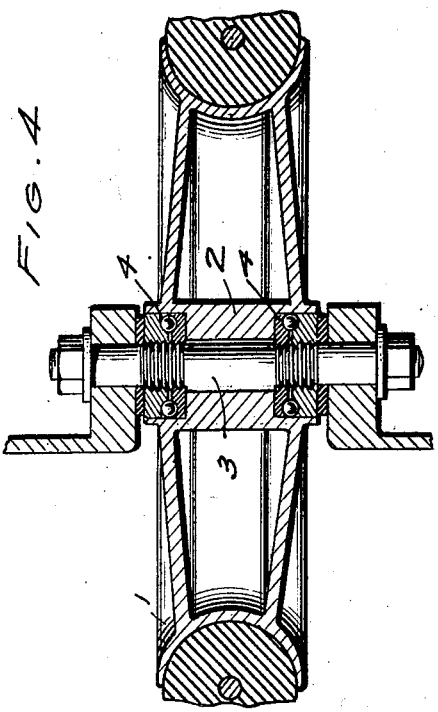
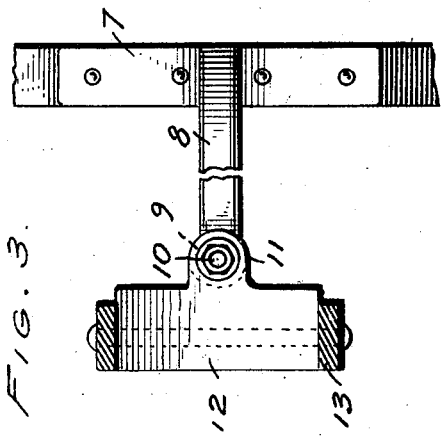
Inventor
MILES W. RUMLEY
By C. A. Snow & Co.
Attorneys Patented Mar. 19, 1929.

1,705,540

UNITED STATES PATENT OFFICE.

MILES W. RUMLEY, OF ALBUQUERQUE, NEW MEXICO.

CHILD'S VEHICLE.

Application filed August 10, 1927. Serial No. 212,057.

This invention relates to a child's vehicle of the "scooter" type, one of the objects being to connect the frame of the structure to the supporting wheels at points off-center so that, during the rotation of the wheels as the vehicle advances, an irregular up and down movement will be imparted to the frame.

A further object is to utilize a frame having resilient portions which, during the irregular up and down movement of the frame, will set up a springing action whereby it becomes quite difficult at times for the rider to retain his or her position on the vehicle, thereby adding material to the pleasure derived from the use of the device.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings, the preferred form of the invention has been shown.

In said drawings,

Figure 1 is a side elevation of the vehicle, one of the positions of the parts being indicated by broken lines.

Figure 2 is a plan view.

Figure 3 is an enlarged section on the line 3—3, Figure 1.

Figure 4 is a section on line 4—4, Figure 1, said section being on an enlarged scale.

Referring to the figure by characters of reference 1 designates supporting wheels which can be of disk construction or of any other type, each wheel being provided at a point remote from its center with a hub 2 in which is journaled a shaft 3, this shaft being provided preferably with ball bearings 4 so that the wheel can rotate freely on the shaft. The ends of the shaft are tightly secured to arms 5 extending toward each other from the rear end of side strips 6, these strips being formed of spring material and connected, at the forward ends, by a front cross strip 7. A spring 8 is extended forwardly and upwardly of the cross strip 7 and is provided, at its forward end, with a sleeve 9 pivotally connected by means of a bolt 10 or the like to ears 11 extending rearwardly from a cross head 12. This cross head is suitably secured within the upper portion of a fork 13 which straddles the front wheel 1 and is connected thereto in the same manner as the arms 5 are connected to the rear wheel 1. The points of connection between the fork and the front wheel have been indicated at 14. A shank 15 is extended upwardly from the fork and is preferably bent rearwardly where it is provided with a cross bar or handle 16. Secured to the forward portions of the side spring strips 6 is a board 17 and attached to the middle portion of this board which constitutes the platform of the vehicle is the lower portion of a bowed spring 18. The upper portion of this spring supports a seat 19 in the form of a saddle.

In using the vehicle it is intended that the child be seated on the saddle 19 and propel the vehicle forwardly in the usual manner by means of one or both feet. As wheels 1 rotate the rear portions of the springs 6 will be moved upwardly and downwardly and the fork 13 will also be moved upwardly and downwardly. This movement will be quite irregular and as the strips 6 are of spring material and the part 8 is also a spring, the parts will obviously yield at the beginning of each impulse in each direction, thereby making it quite difficult for the rider to retain a position on the saddle. This difficulty will be further increased because of the use of a resilient post or spring 18 for the saddle. The vehicle can also be used by standing on the platform 17 instead of occupying the seat or saddle 19.

What is claimed is:

A vehicle of the class described including front and back supporting wheels, a steering fork connected to the front wheel at a point remote from the center thereof, a spring pivotally connected to the steering fork, a handle connected to the steering fork, a platform connected to the spring, spring arms extending from the platform and connected to the rear wheel at points remote from the center thereof, a spring standard mounted on the platform, and a seat supported by said platform.

In testimony that I claim the foregoing as own, I have hereto affixed my signature.

MILES W. RUMLEY.